(12) United States Patent
Moeller

(10) Patent No.: US 6,798,930 B2
(45) Date of Patent: Sep. 28, 2004

(54) METHOD AND APPARATUS FOR PROVIDING INTEGRATED BROADBAND POLARIZATION CONTROL

(75) Inventor: Lothar Benedict Moeller, Hazlet, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 286 days.

(21) Appl. No.: 10/132,010

(22) Filed: Apr. 25, 2002

(65) Prior Publication Data

US 2003/0202226 A1 Oct. 30, 2003

(51) Int. Cl.[7] .......................... G02B 6/00; G02F 1/035
(52) U.S. Cl. ............................ 385/11; 385/3; 385/8; 385/28
(58) Field of Search ..................... 385/11, 14, 28, 385/29, 15, 3, 4, 5, 6, 7, 8

(56) References Cited

U.S. PATENT DOCUMENTS

2003/0039461 A1 * 2/2003 Chun et al. ................. 385/140
2003/0067641 A1 * 4/2003 Wein et al. ................. 359/110
2003/0202749 A1 * 10/2003 Madsen ....................... 385/49
2003/0206676 A1 * 11/2003 Ovadia et al. ............... 385/11

OTHER PUBLICATIONS

"Endless Polarisation Controller Using Electro–Optic Waveplates", H. Shimizu and K. Kaede, Elec. Lett., vol. 24, No. 7, Mar. 31, 1988, pp. 412–413.

"Endless Polarization Control Systems for Coherent Optics," R. Noe et al., J. Lightwave Tech., vol. 6, No. 7, Jul. 1988, pp. 1199–1208.

"Birefringence Control of Silica Waveguides on Si and Its Application to a Polarization–Beam Splitter/Switch," M. Okuno, J. Lightwave Tech., vol. 12, No. 4, Apr. 1994, pp. 625–633.

"Elimination of Polarization Sensitivity in Silica–Based Wavelength Division Multiplexer Using a Polyimide Half Waveplate," Y. Inoue et al., J. Lightwave Tech., vol. 15, No. 10, Oct. 1997, pp. 1947–1957.

"PMD Emulator Restricted to First and Second Order PMD Generation," L. Moller & H. Kogelnik, ECOC'98 Sep. 20–24, 1998, Madrid, Spain.

"Dynamic Wavelength Equalizer in Silica Using the Single-–Filtered–Arm Interferometer," C. R. Doerr et al., IEEE Photonics Tech. Lett., vol. 11, No. 5, May 1999, pp. 581–583.

"Theoretical Basis of Polarization Mode Dispersion Equalization up to the Second Order," T. Kudou, et al. J. Lightwave Tech. vol. 18, No. 4, Apr. 2000, pp. 614–617.

* cited by examiner

Primary Examiner—Hemang Sanghavi

(57) ABSTRACT

An integrated broadband polarization controller is based on planar waveguide technology. The integrated broadband polarization controller emulates the polarization control function of an existing single channel polarization controller in a device that can be built in planar waveguide technology, and is expanded from single channel operation to broadband channel operation by designing the control degrees of freedom to be wavelength selectively addressable.

15 Claims, 4 Drawing Sheets

100

200

300

METHOD AND APPARATUS FOR PROVIDING INTEGRATED BROADBAND POLARIZATION CONTROL

FIELD OF THE INVENTION

This invention relates to the field of optoelectronics and, more specifically, to polarization controllers.

BACKGROUND OF THE INVENTION

Light is an electromagnetic wave composed of electric and magnetic fields. The orientation of these fields defines the light's polarization. As light propagates through an optical fiber, variables such as temperature and stress can cause random and arbitrary changes in the state of the light's polarization, reducing the distance that the light travels due to signal degradation. These changes in the state of polarization can cause problems in fiber optic applications such as optical communication systems and sensors. Polarization controllers can reduce signal degradation in optical systems by converting any incoming polarization state back to the intended polarization state during optical transmissions. The principle of the polarization controller is that a desired polarization state is obtained by using appropriate phase retarders or phase shifters which can transform a state of polarization (SOP) to another arbitrary SOP. For the purposes of achieving this result, two design aspects of polarization controllers are generally considered critical. First, the controller must be able to convert an arbitrary, time variant state of polarization into a specific, desired polarization state. Second, the polarization controller must be able to convert the state of polarization for a wide range of wavelengths for use in optical communication systems, such as those utilizing wavelength division multiplexing (WDM).

Previous work in the field has proposed several different concepts for polarization controllers possessing the two desired design aspects described above, based on mechanically tunable as well as electro-optic effects. For example, see R. Noe, H. Heidrich, D. Hoffman, "Endless Polarization Control Systems for Coherent Optics," Journal of Lightwave Technology, pp. 1199–1207, 1988. It seems that presently, the straight-forward solution for achieving a polarization controller with the ability to convert the state of polarization for a wide range of wavelengths consists of an optical demultiplexer, single channel polarization controllers, and an optical multiplexer. This hybrid combination however, can be costly and physically occupies a large form factor.

SUMMARY OF THE INVENTION

The invention comprises a method and apparatus for providing integrated broadband polarization control. The invention enables an integrated polarization controller, suitable for realization on low-cost material in planar waveguide technology, and compact in size, which can transform a SOP to another arbitrary SOP for a wide range of wavelengths for use in optical communication systems, such as those utilizing wavelength division multiplexing (WDM).

A method for providing broadband polarization control according to an embodiment of the invention includes the steps of splitting an optical signal into a first polarization component and a second polarization component, the second polarization component orthogonal to the first polarization component, retarding the phase of the first polarization component, and recombining the first polarization component and the second polarization component. Alternatively, the method can further include the steps of converting the first polarization component into the orthogonal polarization prior to the retarding, such that the first polarization component and the second polarization component propagate with the same polarization, and converting the first polarization component back to its original polarization state prior to recombining it with the second polarization component.

An apparatus for providing integrated broadband polarization control according to another embodiment of the invention includes a splitting optic for splitting received optical signals into a first polarization component and a second polarization component, the second polarization component orthogonal to the first polarization component, and the first and second polarization components propagating through separate branches of the broadband polarization controller, at least one wavelength selectable phase shifter, for retarding the phase of the first polarization component, and a combining optic for combining the first polarization component and the second polarization component.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
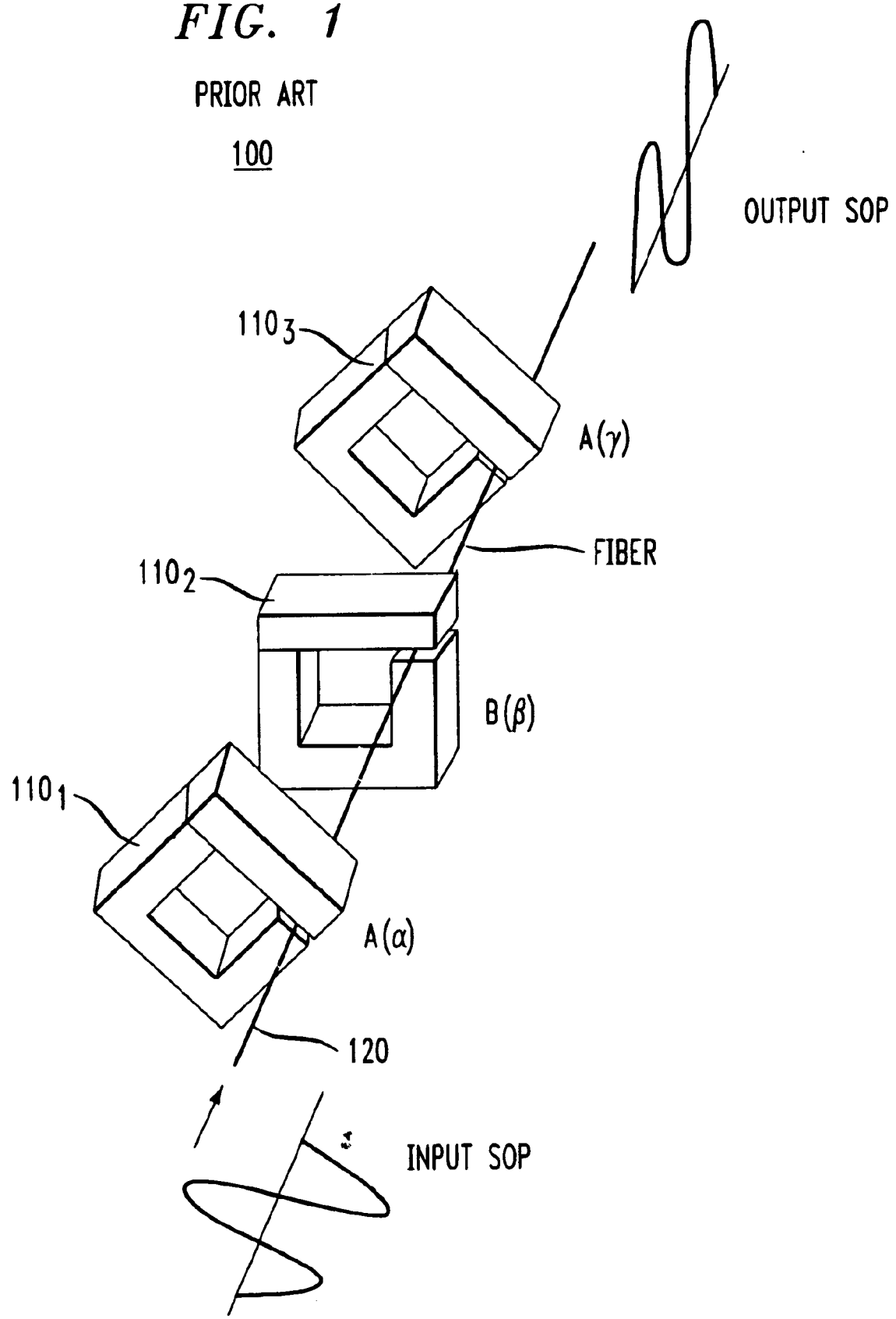
FIG. 1 depicts an embodiment of a single channel polarization controller according to prior art.

FIG. 1 depicts an embodiment of a single channel polarization controller design. (See R. Noe, H. Heidrich, D. Hoffman, "Endless Polarization Control Systems for Coherent Optics," Journal of Lightwave Technology, pp. 1199–1207, 1988). The polarization controller 100 of FIG. 1 provides polarization tuning of an input optical signal's state of polarization (SOP) to a desired output SOP. Briefly stated, an optical signal propagates through the waveguide 120 and subsequently reaches the polarization controller 100. The polarization controller of FIG. 1 includes three fiber squeezers 110₁, 110₂, 110₃. The SOP of the input optical signal is then manipulated to a desired SOP due to the squeezing influence that the fiber squeezers 110₁, 110₂, 110₃ have on the fiber birefringence. Unfortunately, fiber squeezers, as depicted in FIG. 1, occupy a large form factor and cannot be designed in silicon optical bench technology. Thus there exists a need to emulate the polarization control function of an existing single channel polarization controller in a device, suitable for realization on low cost material in planar waveguide technology.

The control function of the fiber squeezers in FIG. 1 is translated into planar waveguide technology. The three fiber squeezers 110₁, 110₂, and 110₃, which are implemented in the controller, are represented in Jones calculus by the two matrices A and B represented below:

$$A(\alpha) = \begin{bmatrix} \cos\alpha & j\cdot\sin\alpha \\ j\cdot\sin\alpha & \cos\alpha \end{bmatrix}; B(\beta) = \begin{bmatrix} \exp(j\beta) & 0 \\ 0 & \exp(-j\beta) \end{bmatrix}. \quad (1)$$

In the above matrices, $\alpha$ and $\beta$ represent variables that describe the squeezing influence in different planes, on the fiber birefringence. Thus the design of the polarization controller 100 of FIG. 1 is described by the Jones matrix product as follows:

$$T(\alpha, \beta, \gamma) = \begin{bmatrix} \cos\gamma & j\cdot\sin\gamma \\ j\cdot\sin\gamma & \cos\gamma \end{bmatrix} \begin{bmatrix} \exp(j\beta) & 0 \\ 0 & \exp(-j\beta) \end{bmatrix} \begin{bmatrix} \cos\alpha & j\cdot\sin\alpha \\ j\cdot\sin\alpha & \cos\alpha \end{bmatrix}. \quad (2)$$

In planar waveguide technology, matrices of type B are more readily identifiable than matrices of type A. Subsequently, matrices of type A can be rewritten as a product of a type B matrix and matrices that describe 3 dB couplers as follows:

$$A(\alpha) = \begin{bmatrix} \cos\alpha & j\cdot\sin\alpha \\ j\cdot\sin\alpha & \cos\alpha \end{bmatrix} = \begin{bmatrix} 1/\sqrt{2} & -1/\sqrt{2} \\ 1/\sqrt{2} & 1/\sqrt{2} \end{bmatrix} \quad (3)$$

$$\begin{bmatrix} \exp(j\alpha) & 0 \\ 0 & \exp(-j\alpha) \end{bmatrix} \begin{bmatrix} 1/\sqrt{2} & 1/\sqrt{2} \\ -1/\sqrt{2} & 1/\sqrt{2} \end{bmatrix}.$$

Using the previous expression, the Jones matrix product can be rewritten as follows:

$$T(\alpha, \beta, \gamma) = \begin{bmatrix} 1/\sqrt{2} & -1/\sqrt{2} \\ 1/\sqrt{2} & 1/\sqrt{2} \end{bmatrix} \begin{bmatrix} \exp(j\gamma) & 0 \\ 0 & \exp(-j\gamma) \end{bmatrix} \quad (4)$$

$$\begin{bmatrix} 1/\sqrt{2} & 1/\sqrt{2} \\ -1/\sqrt{2} & 1/\sqrt{2} \end{bmatrix} \begin{bmatrix} \exp(j\beta) & 0 \\ 0 & \exp(-j\beta) \end{bmatrix} \begin{bmatrix} 1/\sqrt{2} & -1/\sqrt{2} \\ 1/\sqrt{2} & 1/\sqrt{2} \end{bmatrix}$$

$$\begin{bmatrix} \exp(j\alpha) & 0 \\ 0 & \exp(-j\alpha) \end{bmatrix} \begin{bmatrix} 1/\sqrt{2} & 1/\sqrt{2} \\ -1/\sqrt{2} & 1/\sqrt{2} \end{bmatrix}.$$

3 dB couplers possessing the matrix form used in Equation (3) above can be represented by conventional couplers. A conventional coupler has to be manipulated by adding constant phase shifts at the input and the output ports so that the desired transfer matrix is achieved. The added phase shift is realized wavelength independent by changing the path-length in the order of a fraction of the wavelength. A constant phase amount can then be factored out and neglected in the calculation, as it represents a constant phase that is common to both arms. A device based on planar waveguide technology and possessing the same overall transfer matrix as for the above described single channel polarization controller can be constructed using these results.

Figure 2:
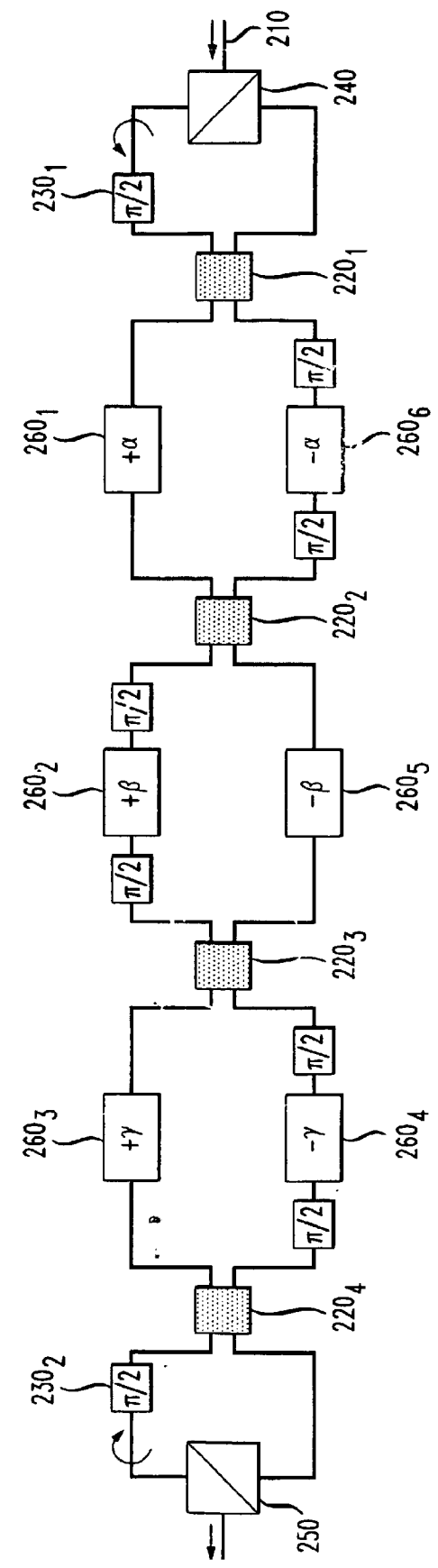
FIG. 2 depicts an embodiment of a single channel polarization controller based on planar waveguide technology, according to the Jones matrix product.

By representing each matrix in the product of Equation 4 by a corresponding device (phase shifters and couplers), the result is the design for the single channel polarization controller shown in FIG. 2. FIG. 2 depicts an embodiment of a single channel polarization controller 200 based on planar waveguide technology, according to the Jones matrix product. The single channel polarization controller 200 includes a waveguide 210, four couplers 220₁, 220₂, 220₃, and 220₄, two mode converters 230₁, and 230₂, a polarization beam splitter 240, a polarization beam combiner 250, and six phase shifters 260₁, 260₂, 260₃, 260₄, 260₅, and 260₆ separated into two groups. Briefly stated, an optical signal enters the waveguide 210 and gets separated into TE and TM polarized components by the polarization beam splitter 240. After being separated into TE and TM polarized components, one of the polarizations is converted into the orthogonal one by the first mode converter 230₁, and subsequently, both signal components propagate with the same polarization along two separate branches of the polarization controller. Examples of this kind of mode mapping are detailed in "PMD Emulator restricted to first and second order PMD Generation," L. Moeller, H. Kogelnik, ECOC '99. vol. II, pp. 64–65, 1999. This technique allows the exploitation of the interference effects between the original TE and TM polarized components in order to achieve mode conversion.

The converted polarized component of the optical signal then propagates along the first branch of the waveguide traversing the four couplers 220₁, 220₂, 320₃, and 220₄ and the first group of three phase shifters 260₁, 260₂, and 260₃ until finally being converted back to its original polarization state by the second of the mode converters 330₂. The three phase shifters 260₁, 260₂, and 260₃ retard the phase of the converted polarized component of the optical signal in the three variable planes, $\alpha(\lambda)$, $\beta(\lambda)$, $\gamma(\lambda)$. The second polarized component of the optical signal propagates along the second branch of the waveguide traversing the four couplers 220₁, 220₂, 220₃, and 220₄ and the second group of three phase shifters 260₄, 260₅, and 260₆. The three phase shifters 260₄, 260₅, and 260₆ retard the phase of the second polarized component of the optical signal in the three variable planes, $\alpha(\lambda)$, $\beta(\lambda)$, $\gamma(\lambda)$. The two polarized components are then recombined by the polarization beam combiner 250. When recombined, the interference effects of the TE and TM components produce a desired polarization state.

Figure 3:
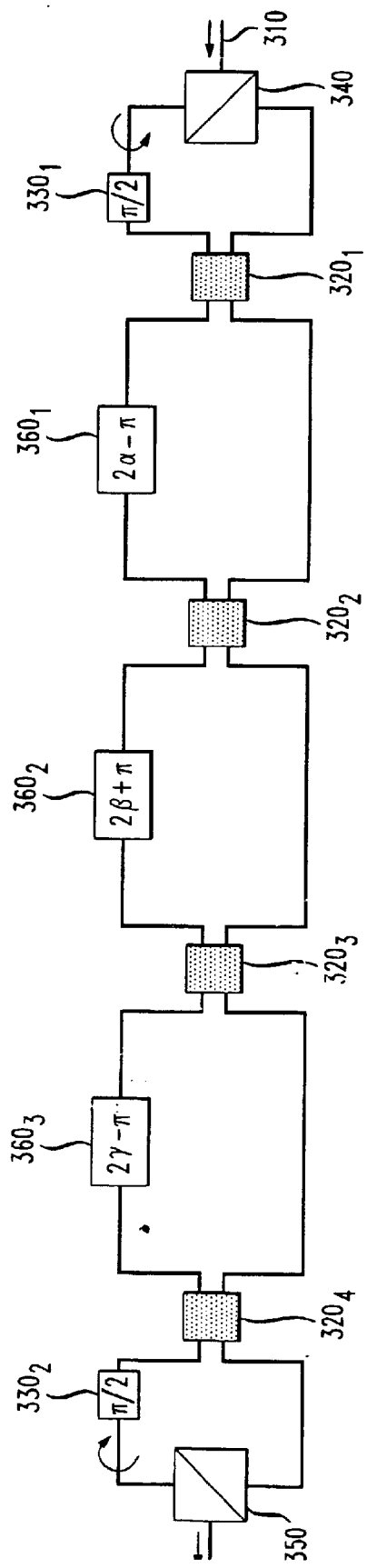
FIG. 3 depicts a simplified design of the single channel polarization controller of FIG. 2.

The design of the single channel polarization controller of FIG. 2 is simplified as shown in FIG. 3. FIG. 3 depicts a simplified design of the single channel polarization controller of FIG. 2. The simplified single channel polarization controller 300 includes a waveguide 310, four couplers 320₁, 320₂, 320₃, and 320₄, two mode converters 330₁, and 330₂, a polarization beam splitter 340, a polarization beam combiner 350, and three phase shifters 360₁, 360₂, and 360₃. Briefly stated, an optical signal enters the waveguide 310 and gets separated into TE and TM polarized components by the polarization beam splitter 340. After being separated into TE and TM polarized components, one of the polarizations is converted into the orthogonal one by the first mode converter 330₁ so both signal components propagate with the same polarization along the two separate branches of the polarization controller.

The converted polarized component of the optical signal then propagates along the first branch of the waveguide traversing the four couplers 320₁, 320₂, 320₃, and 320₄ and the three phase shifters 360₁, 360₂, and 360₃ until finally being converted back to its original polarization state by the second of the mode converters 330₂. The three phase shifters 360₁, 360₂, and 360₃ retard the phase of the optical signal in the three variable planes, $\alpha(\lambda)$, $\beta(\lambda)$, $\gamma(\lambda)$. The second polarized component of the optical signal propagates along the second branch of the waveguide traversing only the four couplers $320_1$, $320_2$, $320_3$, and $320_4$. The two polarized components are then recombined by the polarization beam combiner 350. When recombined, the interference effects of the TE and TM components produce a desired polarization state.

The configuration of FIG. 3 is used as a single channel polarization controller. In order for this set up to be suitable for use in a WDM system, the phase shifting has to be carried out independently for the various wavelengths. It would then be necessary to implement wavelength selectable phase shifters instead of the phase shifters in FIG. 3.

Figure 4:
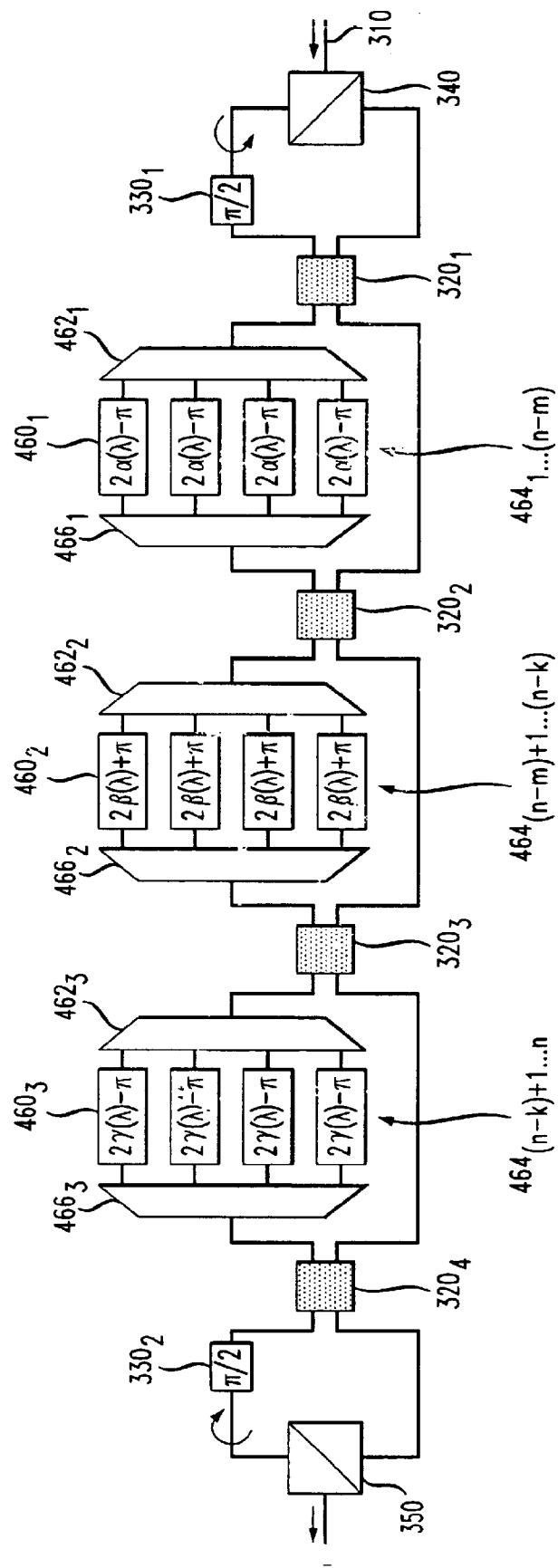
FIG. 4 depicts an embodiment of an integrated broadband polarization controller based on planar waveguide technology.

Wavelength selectable phase shifters can be built using an optical demultiplexer (DeMux), an array of parallel phase shifters, and an optical multiplexer (Mux), as depicted in FIG. 4. Thus the complete design, possessing broadband polarization control for all of the WDM channels of a WDM system and possessing the same transfer function for each channel depending on $\alpha(\lambda)$, $\beta(\lambda)$, $\gamma(\lambda)$, such as the fiber squeezer based device for single channel controllers, is given by the overall design shown in FIG. 4.

FIG. 4 depicts an embodiment of an integrated broadband polarization controller 400 based on planar waveguide technology. The broadband polarization controller 400 includes a waveguide 310, four couplers $320_1$, $320_2$, $320_3$, and $320_4$, two mode converters $330_1$, and $330_2$, a polarization beam splitter 340, a polarization beam combiner 350, and three wavelength selectable phase shifters $460_1$, $460_2$ and $460_3$ (collectively 460). Briefly stated, an optical signal enters the waveguide 310 and gets separated into TE and TM polarized components by the polarization beam splitter 340. After being separated into TE and TM polarized components of the incoming optical signal, one of the polarizations is converted into the orthogonal one by the first mode converter $330_1$ so that both signal components propagate with the same polarization along the two separate branches of the broadband polarization controller. The converted polarized component of the optical signal then propagates along the first branch of the waveguide through the first coupler $320_1$ until it reaches the first wavelength selectable phase shifter $460_1$.

The three wavelength selectable phase shifters 460 are comprised of three optical demultiplexer $462_1$, $462_2$, $462_3$ (collectively 462), an array of parallel phase shifters $464_1$–$464_n$ (collectively 464), and three optical multiplexers $466_1$, $466_2$, $466_3$ (collectively 466). Each wavelength selectable phase shifter 460 is comprised of one demultiplexer 462, an array of parallel phase shifters 464, and a multiplexer 466. In the embodiment shown in FIG. 4, the optical demultiplexers 462 and the optical multiplexers 466 are Arrayed Waveguide Grating (AWG) filters.

The converted polarized component of the optical signal reaches the first demultiplexer $462_1$ and is separated into a plurality of wavelength components. The number of wavelengths, and subsequently, the number of phase shifters 464, are determined by the number of wavelength components that the converted polarized component of the optical signal is divided into by the first demultiplexer $462_1$. The wavelength components of the converted polarized component of the optical signal then propagate through individual phase shifters 464. Each phase shifter 464 is chosen for the particular wavelength region it will operate on. Each phase shifter 464 retards the phase of the signal in equal amounts to the other phase shifters 464 to produce a resultant signal with a different phase than the input signal. The various wavelength components of the optical signal pass through the respective phase shifters 464 and are then recombined by the first multiplexer $466_1$. The optical signal then propagates through the waveguide, passing through the second coupler $320_2$, until it reaches the second wavelength selectable phase shifter $460_2$. The optical signal is phase shifted in the second variable plane by the second wavelength selectable phase shifter $460_2$ and propagates though the third coupler $320_3$ to the third wavelength selectable phase shifter $460_3$. The converted polarized component of the optical signal is phase shifted in the third variable plane by the third wavelength selectable phase shifter $460_3$ then propagates through the fourth coupler $320_4$ until finally being converted back to its original polarization state by the second of the mode converters $330_2$.

The second polarized component of the optical signal propagates along the second branch of the waveguide traversing only the four couplers $320_1$, $320_2$, $320_3$, and $320_4$. The two polarized components are then recombined by the polarization beam combiner 350. When recombined, the interference effects of the TE and TM components produce a desired polarization state.

The broadband polarization controller of FIG. 4 provides the ability to convert an arbitrary, time variant state of polarization into a specific, desired polarization state, and the ability to convert the state of polarization for a wide range of wavelengths for use in WDM systems, on low-cost material in planar waveguide technology, and in a compact size. Although the demultiplexers 462 and multiplexers 466 of FIG. 4 were illustrated to be Arrayed Waveguide Grating filters, it would be evident to those skilled in the art that other embodiments of the present invention would include other planar waveguide components to be used as the demultiplexers and the multiplexers in a broadband polarization controller.

In another embodiment of a broadband polarized controller, the mode converters at the input and output of the broadband polarization controller can be eliminated. In this embodiment, the amounts for $\alpha(\lambda)$, $\beta(\lambda)$, $\gamma(\lambda)$ phase shifting have to be adjusted to compensate for the fact that the two polarization components of the optical signal are not propagating through the two separate branches of the broadband polarization controller with the same polarization.

In other embodiments of the present invention, broadband polarization controllers, similar to the broadband polarization controller of FIG. 4, can be designed containing additional control elements to enhance the tolerance of the design. This is similar to single channel polarization controllers with four or more fiber squeezers.

In another embodiment of the present invention, a broadband polarization controller is built for endless transformation of an arbitrary input state of polarization into an arbitrary output state of polarization by combining two of the described broadband polarization controllers. The overall setup is then simplified by removing the polarization beam splitter and combiner and connecting the corresponding input and output ports directly to each other. The number of multiplexers and demultiplexers is then reduced to five.

While the forgoing is directed to some embodiments of the present invention, other and further embodiments of the invention may be devised without departing from the basic scope thereof. As such, the appropriate scope of the invention is to be determined according to the claims, which follow.

What is claimed is:

1. A method for broadband polarization control of an optical signal comprising:

splitting said optical signal into a first polarization component a second polarization component, said second polarization component orthogonal to said first polarization component;

retarding the phase in at least two planes of at toast one of sa first polarization component and said second polarization component by a predetermined amount; and recombining said first polarization component and said second polarization component to attain a desired polarization state for said optical signal.

2. The method of claim 1, further comprising:

converting said first polarization component into the orthogonal polarization prior to said retarding, such that said first polarization component and said second polarization component comprise substantially the same polarization; and converting said first polarization component back to the origins polarization state prior to said recombining.

3. The method of claim 1 wherein said first polarization component and said second polarization component are the TE and TM polarization states.

4. The method of claim 1 wherein said optical signal comprises a WDM optical signal and wherein the phases of each of the wavelength components of the polarization component of said WDM optical signal that is to be retarded are respectively and individually retarded.

5. A broadband polarization controller, comprising:

an optical splitter for splitting a received optical signal into a first polarization component and a second polarization component, said second polarization component orthogonal to said first polarization component, and said first and second polarization components propagating along separate branches of the broadband polarization controller;

at least one phase shifter for retarding the phase in at least two planes of at least one of said first polarization component a said second polarization component by a predetermined amount; and an optical combiner for combining said first polarization component and said second polarization component to attain a desired polarization state for said optical signal.

6. The broadband polarization controller of claim 5, further comprising:

a first mode converter for converting the first polarization component into the orthogonal polarization such that said first polarization component an said second polarization component propagate with substantially the same polarization along the separate branches of said broadband polarization controller; and a second mode converter for converting the first polarization component back to the original polarization state prior to the combining of said first polarization component and said second polarization component.

7. The broadband polarization controller of claim 5, wherein said optical splitter comprises a polarization beam splitter.

8. The broadband polarization controller of claim 5, wherein said first polarization component and said second polarization component are the TE and TM polarization states.

9. The broadband polarization controller of claim 5, wherein said optical combiner comprises a polarization beam combiner.

10. The broadband polarization controller of claim 5, wherein said optical signal comprises a WDM optical signal and wherein said at least one phase shifter comprises at least one wavelength selectable phase shifter.

11. The broadband polarization controller of claim 10, wherein said at least one wavelength selectable phase shifter respectively and individually retards the phases of each of the wavelength components of the polarization component of said WDM optical signal that is to be retarded.

12. The broadband polarization controller of claim 10, wherein said at least one wavelength selectable phase shifter comprises:

a demultiplexer for separating said polarization component to be retarded into individual wavelength components;

at least one phase shifter for respectively retarding the phase of each of said wavelength components; and a multiplexer for recombining said wavelength components.

13. The broadband polarization controller of claim 10, wherein said demultiplexer comprises an Arrayed Waveguide Grating filter.

14. The broadband polarization controller of claim 12, wherein said multiplexer comprises an Arrayed Waveguide Grating filter.

15. The broadband polarization controller at claim 5, wherein said polarization controller is integrated using planar waveguide technology.

* * * * *